No. 779,459.

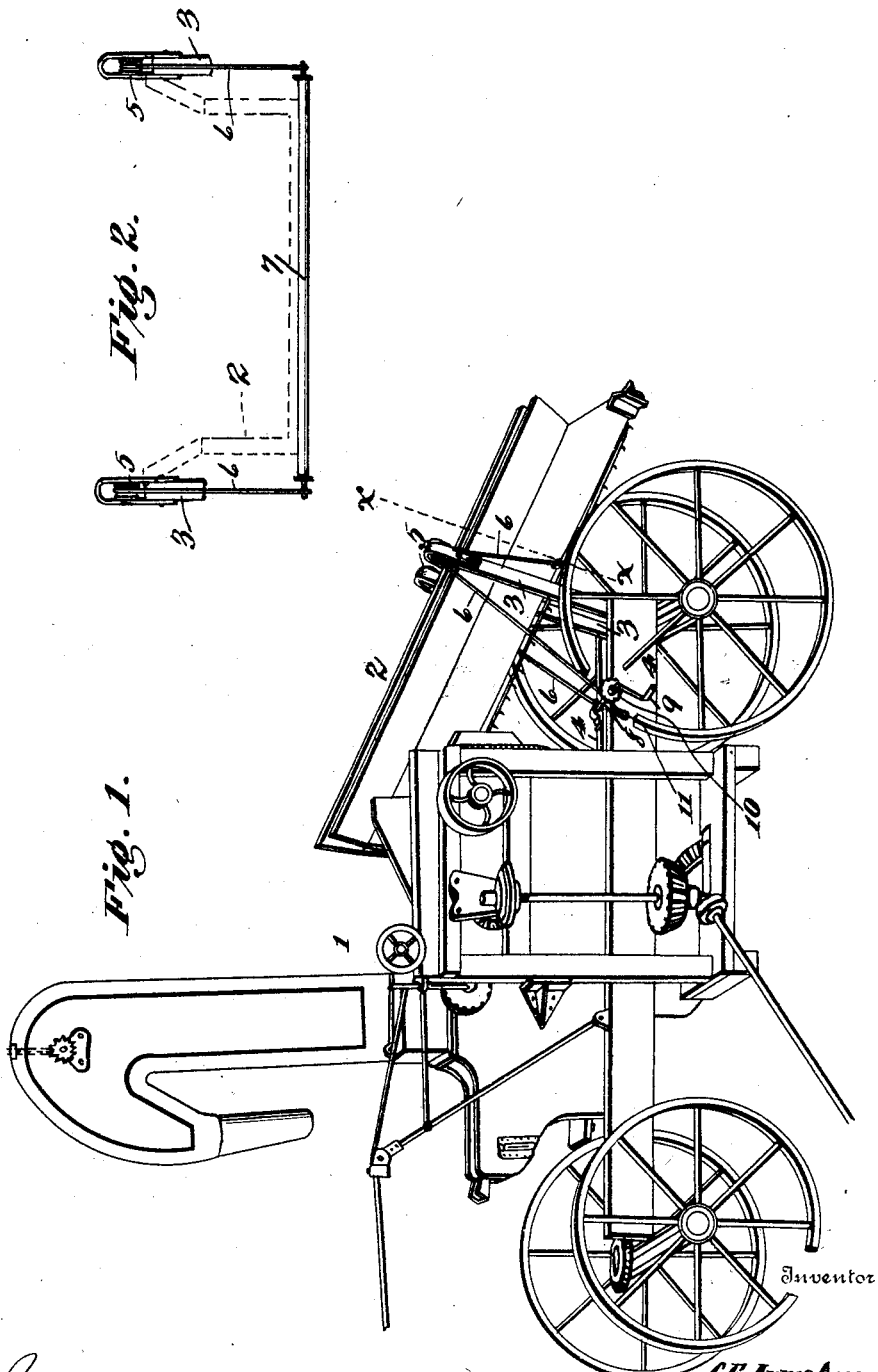

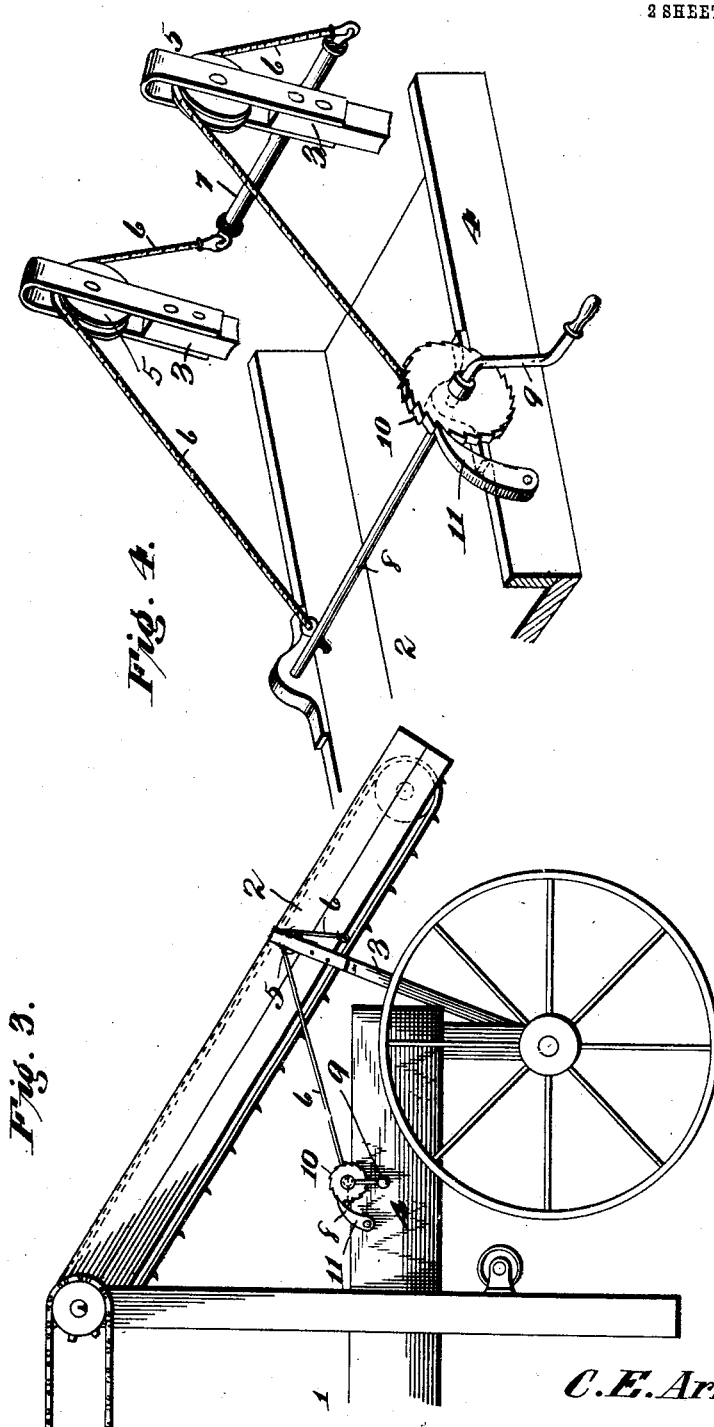

Patented January 10, 1905.

UNITED STATES PATENT OFFICE.

CLARENCE E. ARMSTRONG, OF LEWIS, IOWA.

MEANS FOR ADJUSTING THE FEEDERS OF SHELLERS.

SPECIFICATION forming part of Letters Patent No. 779,459, dated January 10, 1905.

Application filed April 23, 1904. Serial No. 204,624.

*To all whom it may concern:*

Be it known that I, CLARENCE E. ARMSTRONG, a citizen of the United States, residing at Lewis, in the county of Cass and State of Iowa, have invented certain new and useful Improvements in Means for Adjusting the Feeders of Shellers, of which the following is a specification.

This invention aims to dispense with the means usually employed for adjusting the feeder of corn-shellers and to substitute therefor mountings which will admit of the feeder being raised or lowered at its receiving end without the intervention of blocks, props, or like removable supports.

In accordance with this invention the feeder is vertically movable between the posts or standards projected upward from the frame of the truck or machine and is supported by ropes or cables connected at one end to the feeder and adapted to have the opposite end wound upon the shaft or windlass and passed over pulleys applied to the upper ends of said posts or standards.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1 is a perspective view of a sheller of ordinary construction having the feeder mounted in accordance with this invention. Fig. 2 is a transverse section of the feeder about on the line X X of Fig. 1. Fig. 3 is a detail view in elevation of a portion of the feeder and sheller, showing the parts on a larger scale. Fig. 4 is a detail perspective view of the operating means for raising and lowering the feeder.

Corresponding and like parts are referred to in the following description and indicated in all the views of the drawings by the same reference characters.

The sheller 1 and feeder 2 are of ordinary construction. Posts or standards 3 extend upward from the rear corners of the frame 4 of the sheller and are provided at their upper ends with grooved pulleys 5, around which pass ropes or cables 6. The feeder 2 is loosely supported between the standards 3, so as to be raised or lowered at its rear end. A rod or bar 7 is connected to one end of the ropes or cables 6 and extends beneath the feeder and forms a support therefor. A shaft 8 is journaled in bearings applied to side pieces of the frame 4 between the posts 3 and the uprights of the frame and is provided at one end with a crank-handle 9 to impart rotation thereto for winding the ropes or cables 6 upon the shaft when the rear end of the feeder is to be elevated. A ratchet-wheel 10, secured to the shaft 8, coöperates with a pawl 11 to hold the shaft and feeder in the required position. The ropes or cables 6 are attached to the shaft 8 in any determinate way.

The feeder 2 is loosely connected to the framework of the sheller at its upper end in the usual manner to admit of its rear portion being raised and lowered. The posts or standards 3, between which the feeder is located, prevent lateral displacement of the feeder and at the same time provide supporting means for the pulleys 5. The rear portion of the feeder is elevated by rotating the shaft 8 to wind the ropes or cables 6 thereon. To lower the rear end of the feeder, the shaft 8 is turned, so as to permit the ropes or cables to unwind therefrom. The pawl 11 and ratchet-wheel 10 hold the feeder in the adjusted position.

Having thus described the invention, what is claimed as new is—

In combination with a sheller and a feeder therefor, elevating means for the feeder, the same consisting of posts secured to and projected upward from the rear corners of the frame of the sheller, pulleys at the upper ends of the posts, a shaft journaled to the sheller between said posts and the uprights of the frame, a ratchet and pawl for holding the shaft in an adjusted position, a rod arranged beneath the feeder and forming a support therefor, and ropes attached at one end to said rod and at the opposite end to the shaft and passed over the pulleys at the upper ends of the post intermediate of their ends, substantially as specified.

In testimony whereof I affix my signature in presence of two witnesses.

CLARENCE E. ARMSTRONG. [L. S.]

Witnesses:
B. C. HARRIS,
W. B. DAVIS.